(12) United States Patent
Drake et al.

(10) Patent No.: US 6,377,394 B1
(45) Date of Patent: Apr. 23, 2002

(54) OPTICAL AMPLIFIER GAIN CONTROL

(75) Inventors: Jonathan Drake; Barrie Flintham, both of Devon (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/539,121

(22) Filed: Mar. 30, 2000

(51) Int. Cl.[7] .................................................. H01S 3/00
(52) U.S. Cl. ........................ 359/341.41; 359/337.4
(58) Field of Search ........................ 359/194, 337, 359/337.1, 337.11, 337.12, 337.13, 337.2, 337.21, 337.22, 337.3, 337.4, 337.5, 341.1, 341.2, 341.3, 341.31, 341.32, 341.33, 341.4, 341.41, 341.42, 341.43, 341.44, 341.5; 372/38.01, 38.02, 38.06, 6

(56) References Cited

U.S. PATENT DOCUMENTS

| | | | | |
|---|---|---|---|---|
| 5,293,263 A | * | 3/1994 | De Rijck | ..................... 357/180 |
| 5,299,055 A | * | 3/1994 | Yoneyama | ................... 359/341 |
| 5,838,488 A | * | 11/1998 | Kobayashi | ................... 359/341 |
| 5,900,968 A | * | 5/1999 | Srivastava et al. | .......... 359/341 |
| 6,028,698 A | * | 2/2000 | Ogoshi et al. | ............... 359/341 |
| 6,064,515 A | * | 5/2000 | Yang | ........................... 359/341 |
| 6,166,850 A | * | 12/2000 | Roberts et al. | ............. 359/341 |

* cited by examiner

Primary Examiner—Thomas H. Tarcza
Assistant Examiner—Deandra M. Hughes
(74) Attorney, Agent, or Firm—Lee, Mann, Smith, McWilliams, Sweeney & Ohlson

(57) ABSTRACT

An optical amplifier comprises: at least first and second amplifier stages, each stage comprising a doped fiber and a pump source for providing pump light to the fiber. The input and output power of the amplifier is measured to enable automatic gain control. The input and output power is processed in order to derive target pump source levels for achieving a substantially constant gain, and the temporal response of the gain control loop is varied in dependence on the target pump source levels. The response time of the gain control loop is thus matched to the open loop gain of the amplifier, taking into account the combination and settings of the amplifier stages.

5 Claims, 3 Drawing Sheets

OPTICAL AMPLIFIER GAIN CONTROL

FIELD OF THE INVENTION

This invention relates to optical communications systems and, more particularly, a gain control system for optical amplifiers for use in such systems.

BACKGROUND OF THE INVENTION

Large capacity optical transmission systems typically combine high speed signals on a signal fiber by means of Wavelength Division Multiplexing (WDM) to fill the available bandwidth. In these WDM optical transmission systems, in general, rare-earth doped fiber optical amplifiers (such as Erbium or Erbium-Ytterbium doped) are used to compensate for the fiber link and splitting losses. Such amplifiers are provided with laser pump light to cause the optical amplification.

To provide both low-noise and high gain in rare-earth doped fiber amplifiers, two lasers (pumps) of different wavelengths may be applied to the amplifying medium, one pump signal (usually the one with the shorter wavelength) propagates with the signal to be amplified (co-propagating), while the other pump signal propagates oppositely the signal to be amplified (counter-propagating).

Gain transients, where step changes in the amplifier gain are caused by variations in input signals, are a major problem for WDM optical systems. Gain transients occur because channels are added or dropped either due to network reconfiguration or failures. Adding channels can depress the power of the present channels below the receiver sensitivity. Dropping channels can give rise to error events in the surviving channels because the power of the surviving channels can surpass the thresholds for non-linear effects. The error bursts in the surviving or present channels as a result of these power transients are unacceptable to service providers. Various other factor also give rise to gain modulation, causing non-uniform amplifier gain.

Some of these effects can be eliminated if the amplifier gain, and hence gain spectrum, is controlled independently of input signal level. In this way, a constant gain can be maintained regardless of the number of channels present at the input. This requires rapid gain control to respond to channel adding and dropping at the input, without giving rise to large or prolonged gain transient effects. Known systems for implementing independent amplifier gain control use automatic gain control (AGC) in the form of opto-electronic or all optical feedback loops for controlling the laser pump source to provide a required change in amplifier pumping. The all-optical option is more desirable in terms of reduced complexity and cost.

AGC schemes may use feedforward or feedback loops, or a combination of these, in order to derive control signals from measures of input and output powers so as to increase the amplifier pump power when more output power is required.

It is also known to provide a series of so-called concatenated amplifier stages within a single optical amplifier. Each stage has its own associated doped fiber section and pump sources. For each individual stage, the noise performance is improved for higher power operation. With this in mind, it has been recognised that the first stage within such an amplifier should be operated at the highest possible power, so that the noise introduced by the first stage, and which is amplified by subsequent stages, is kept to a minimum. Of course, imposing a minimum pump power for the first stage provides a limitation to the dynamic range of the gain control system.

The inventors have recognised a further problem arising with multiple-stage optical amplifiers, particularly when individual stages of the amplifier may be switched in or out of operation depending upon the gain requirement. When an amplifier stage is introduced in response to an increased gain demand, by driving the pump source or sources of that stage, the open loop gain of the amplifier is altered. Accordingly, a fixed processing regime for the input and/or output powers to derive the required pump control will not take into account this varying open loop gain, so that the control loop will not be optimum.

SUMMARY OF THE INVENTION

According to the invention, there is provided an optical amplifier comprising:

at least first and second amplifier stages, each stage comprising a doped fiber and a pump source for providing pump light to the fiber;

a power measurement circuit for measuring the input and output power of the amplifier; and a driver circuit for providing pump control signals for controlling the pump source of each amplifier stage in dependence on the input and output power in order to maintain a substantially constant gain, the power measurement circuit and the driver circuit defining a gain control loop, wherein the input and output power is processed in order to derive target pump source levels for achieving the substantially constant gain, and wherein the temporal response of the gain control loop is varied in dependence on the target pump source levels.

The gain control loop will have different open loop gain depending upon the target pump source levels, which in turn define the combination and levels of the amplifier stages to be operation. The transfer function of the control loop is altered in dependence on these amplifier settings, and according to the invention the control loop characteristics are altered in response to these changes in open loop gain. The response time of the gain control loop is therefore matched to the open loop gain of the amplifier, taking into account the combination and setting of the amplifier stages which are to be active.

Preferably, the doped fiber of each stage comprises an Erbium doped optical fiber. The power measurement circuit is preferably for measuring the input and output power of the amplifier, so that a constant gain can be achieved.

The driver circuit may generate the target pump source levels by processing an error signal using a digital signal processor, and the target pump source levels then influence the processing of the error signal thereby changing the temporal response of the gain control loop.

The digital signal processor may comprise a PID controller for processing the error signal, and the proportion term is then varied in dependence on the target pump source levels.

The generation of the pump source target levels may be such that a first general pump drive level input to the mapping device gives rise to target pump source levels with the pump source of one amplifier stage turned on and the pump source of the other amplifier stage turned off, and a second general pump drive level input to the mapping device gives rise to target pump source levels with the pump source of both amplifier stages turned on. In other words, a pump control scheme is provided by which the pump sources can be controlled independently to be switched in or out of operation depending on the overall pump power required to maintain the desired gain.

The invention also provides a method of controlling an optical amplifier comprising at least first and second amplifier stages, each stage comprising a doped fiber and a pump source for providing pump light to the fiber, the method comprising;

measuring the power at the input and output of the amplifier;

processing the input and output power in order to derive target pump source levels for achieving a substantially constant gain, the power measurement and pump source control implementing a gain control loop, wherein the temporal response of the gain control loop is varied in dependence on the target pump source levels.

The AGC loop can be implemented as a DSP, and the invention thereby further provides a storage medium containing computer executable instructions for processing two inputs representing an input and an output power of an optical amplifier comprising at least first and second amplifier stages, the instructions implementing a method comprising the steps of:

calculating a target output power from the input power;

obtaining an error signal representing the difference between the target output power and the output power;

processing the error to derive a target pump level for the amplifier, and deriving individual target pump source levels for the individual amplifier stages from the target pump level, deriving individual pump source control signals to achieve the target pump source levels, wherein the processing of the error takes into account the obtained target pump level.

The error may be processed using a PID controller, and the proportional control of the PID controller being weighted in dependence on the target pump level, taking into consideration the individual target pump source levels corresponding to the target pump level.

BRIEF DESCRIPTION OF THE DRAWINGS

An example of the invention will now be described in detail with reference to the accompanying drawings, in which.

DETAILED DESCRIPTION

Figure 1:
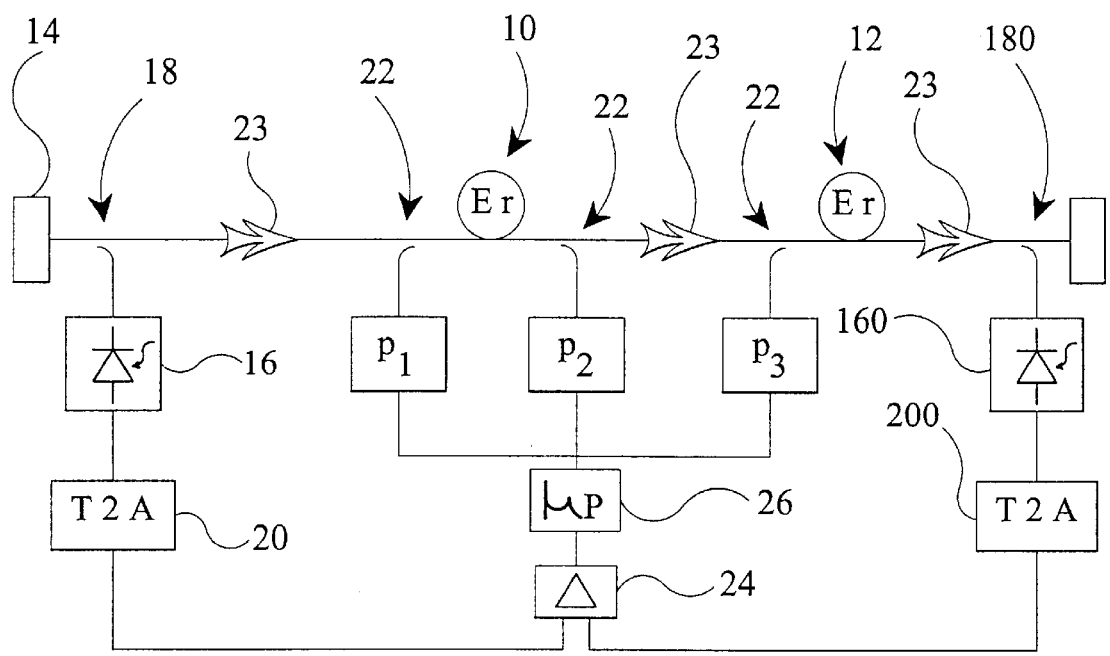
FIG. 1 shows a known multi-stage Erbium doped fiber amplifier (EDFA) with automatic gain control.

FIG. 1 shows a known multi-stage erbium doped fiber amplifier with automatic gain control. The amplifier has two stages comprising erbium-doped fibers 10 and 12. An input to the amplifier 14 normally comprises a plurality of wavelength division multiplexed channels. The input power applied to the amplifier is measured using a photo detector 16 which receives a proportion of the input signal which is tapped off the main input line using a tap coupler 18. The photodiode 16 is responsive to the duration and intensity of optical pulses at the input and generates an output current. This is converted by a transimpedance amplifier 20 into a voltage representing the power of the optical pulses at the input. A similar power measurement circuit is provided at the output of the amplifier, again comprising a photodiode 160, a tap coupler 180 and a transimpedance amplifier 200.

In the example shown in FIG. 1, the first amplifier 10 is co-pumped and counter-pumped, by pump sources $P_1$ and $P_2$, respectively. The pump light is generated by laser diodes, at a number of possible wavelengths, for example 980 nm or 1480 nm. For example, the co-pump source $P_1$ may comprise a 980 nm laser diode, whereas the counter-pump source $P_2$ may comprise a 1480 nm laser diode. In the example shown in FIG. 1, the second amplifier 12 is provided only with a co-pumping source $P_3$.

In each case, the pump power is introduced to the optical fiber line using a fused fiber wavelength division multiplexer 22. Optical isolators 23 are provided between the stages and at the input and output of the amplifier. The isolators prevent the passage of backward-propagating ASE.

The measured input and output powers are supplied to a circuit 24 for deriving an error signal. This circuit 24 calculates a target output power based on the measured input power and the desired gain of the amplifier. Essentially, the input power is multiplied by the desired gain, and an ASE compensation factor is added. This gives the output power which is required to achieve the desired level of signal gain. The purpose of the amplifier control system is to maintain a substantially constant gain.

The circuit 24 derives an error between the target output power and the measured output power, and this error signal is used to control the pump sources $P_1$ to $P_3$ to alter the amplifier pumping conditions to achieve the required gain.

Changes in the pumping conditions may be required in response to changes in the input signal, for example in response to the adding or dropping of WDM channels. The error signal is supplied to a processor 26 which calculates a target pump level for the system, this target pump level being used to drive the three laser diode pump sources $P_1$ to $P_3$.

FIG. 1 shows the single microprocessor output being supplied to all laser diode pumps. In this way, the pumps are all controlled in proportion in response to the overall pump level required by the amplifier.

Figure 2:
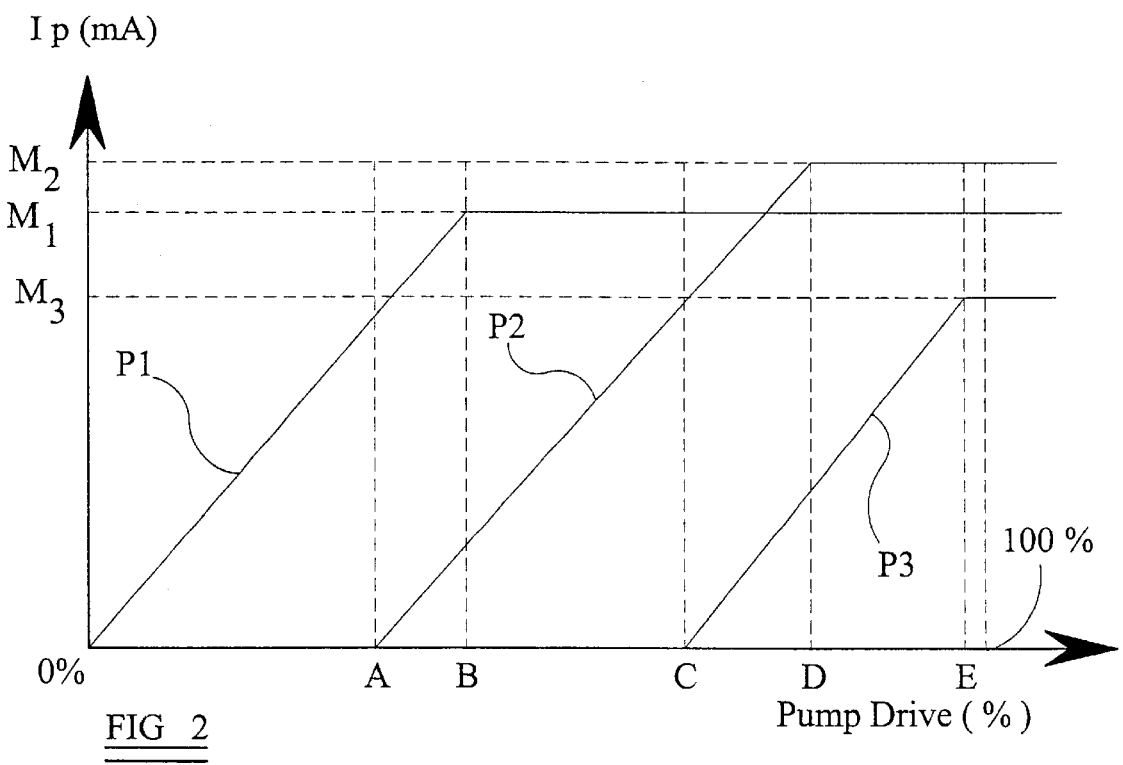
FIG. 2 shows schematically one possible control scheme for a multi-stage amplifier to provide gain control.

However, a preferred pump drive scheme is represented in FIG. 2 by which independent pump control is provided, and this pump scheme is used in the automatic gain control system of the invention.

FIG. 2 shows the laser diode pump current versus an overall pump drive level required by the amplifier, to achieve the desired constant gain. If noise is introduced by one of the first amplifier stages, this introduced noise becomes amplified in the following stages. Therefore, it is desirable to reduce to a minimum the noise introduced at the input end of the amplifier. Low inversion is achieved in an optical amplifier, giving rise to a poor optical noise figure, when the amplifier is operated at low power levels. Consequently, the power from the first pump should be kept at a high level to maintain a low noise figure. At low gain or output settings the pump power in subsequent pumps may be small or zero, so that all output power control is effected by control of the first pump in the chain.

As shown in FIG. 2, when the amplifier requires only a small amount of pump signal to achieve the required gain, this is achieved by means only of the first laser diode pump source $P_1$. Thus, between levels 0 and A laser diode pumps $P_2$ and $P_3$ are turned off. At point A the counter-pump $P_2$ is also introduced. This is before the first pump source $P_1$ has reached its maximum level $M_1$, because some overlap is required to take account of threshold changes of the laser diode pump sources over time. Similarly, before the second laser diode pump source $P_2$ has reached its maximum level $M_2$, the third pump source $P_3$ is introduced, at point C.

The pump control scheme implemented by FIG. 2 maps from a general pump drive level to individual pump source levels. Different general pump drive levels result in different combinations of the pump sources being active. Consequently, the open loop gain of the amplifier in response to an increase in the general pump drive level varies as a function of that pump drive level. For example, if an increase in pump drive level is demanded between points A and B this gives rise to an increase in pump drive current for the two pump sources $P_1$ and $P_2$, whereas an increase in overall pump drive level between 0 and A gives rise only to an increase in the drive current of the first pump $P_1$.

It is desirable for any change in the pump drive level to produce changes in the individual pump currents as quickly as possible, and without risk of instability in the control loop. In other words, the automatic gain control loop should be critically damped, which means that the temporal response of the gain control loop should match the open loop gain characteristics of the amplifier. As explained above, the open loop gain characteristics of the amplifier depend upon the pump sources in operation at the existing pump drive level.

Figure 3:
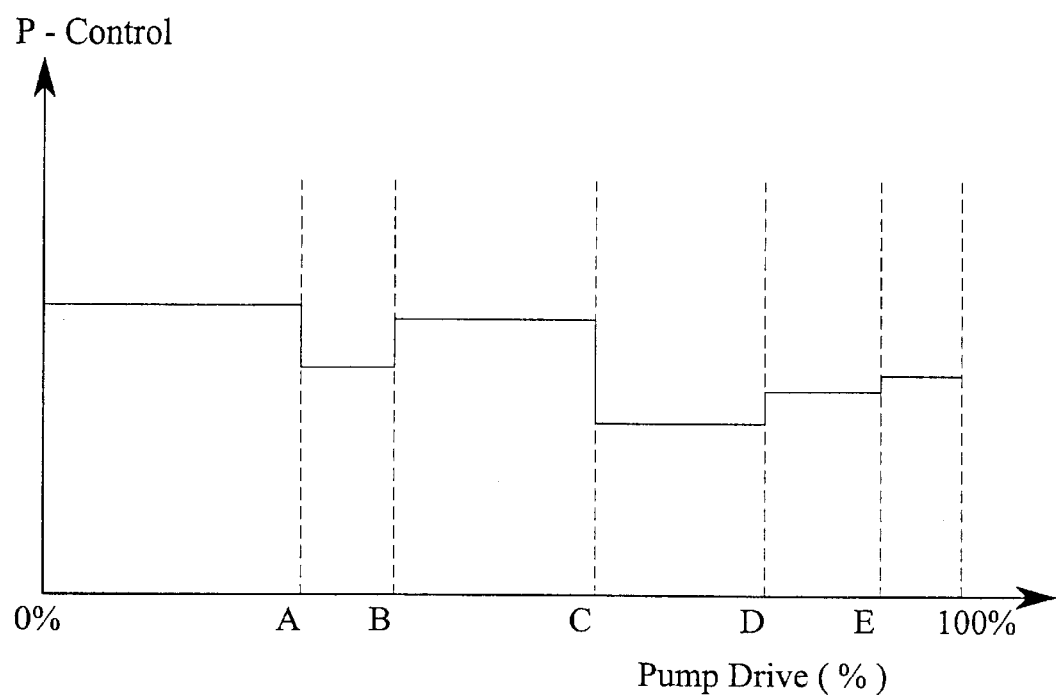
FIG. 3 shows schematically a control scheme of the invention for altering the temporal response of the gain control loop.

FIG. 3 shows a control scheme of the invention by which the temporal response of the gain control loop is altered. FIG. 3 represents the amount by which the error signal is amplified in order to produce the pump control signals. The greater the amplification of the error signal the faster the control loop. However, if the speed of the control loop exceeds the response time of the amplifier, there will be over damping, which prolongs the time required for the system to reach a new equilibrium. Similarly, if the speed of the control loop is too slow oscillations and instability may result.

As shown in FIG. 3, the amplification, which is termed "P-control" for reasons which will become apparent from the following, experiences a transition at each of the points A-E represented in FIG. 2. Thus, each time an additional pump is introduced there is a drop in the amplification factor, whereas each time a pump reaches saturation (at points B, D and E) there is a step increase in the amplification level. The overall result is that the automatic gain control loop compensates for the open loop gain changes to maintain optimum damping.

Figure 4:
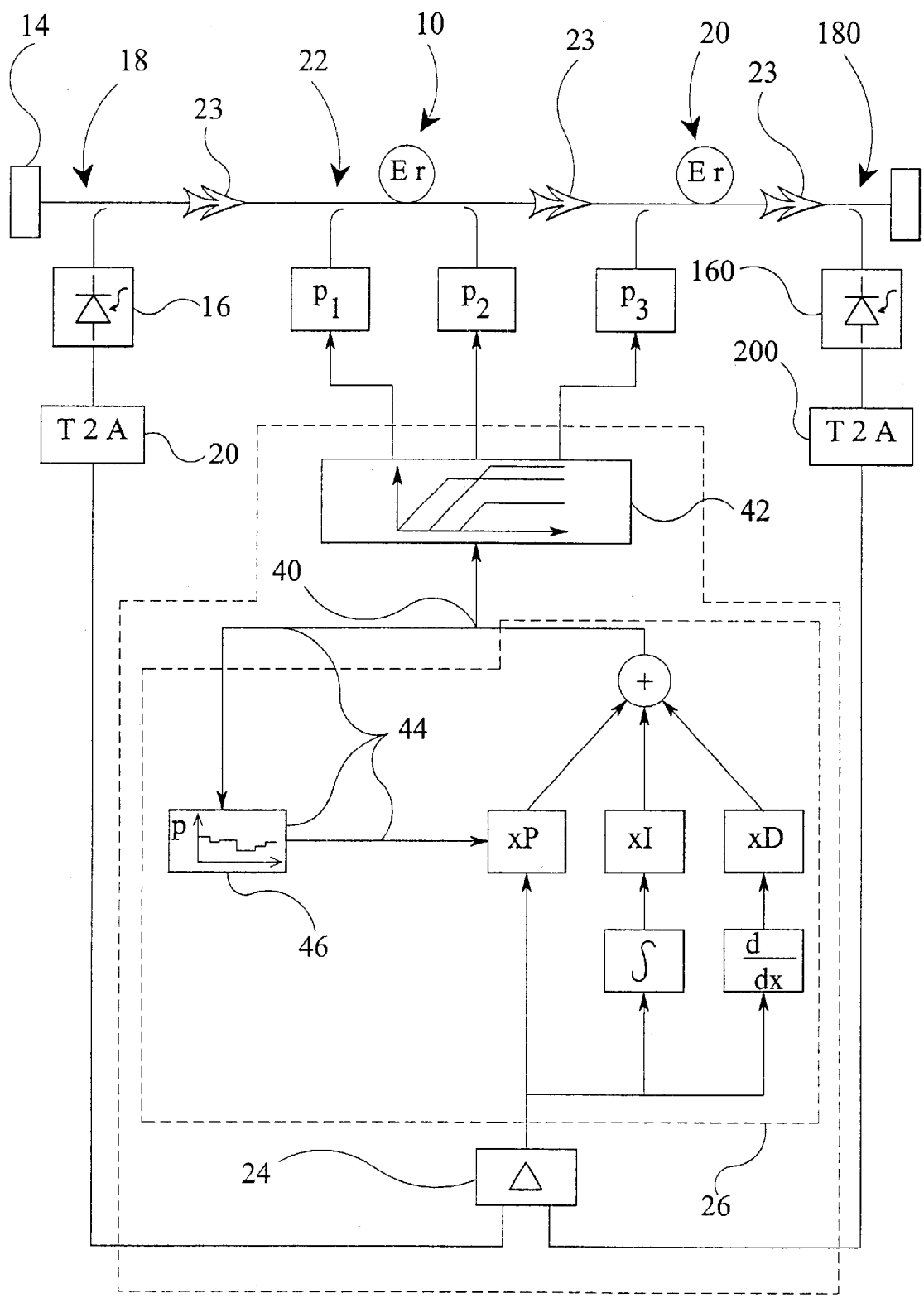
FIG. 4 shows an EDFA with automatic gain control according to the invention.

FIG. 4 shows an optical amplifier according to the invention which implements the control schemes discussed above.

Components in FIG. 4 corresponding to the components of FIG. 1 have been given the same reference number, and will not be described again. The error generating circuit 24, which compares a target output level and the measured output level again supplies this error value to a processor 26. This processor implements a PID (proportional-integral-derivative) controller, and the output 40 of the PID controller is the general pump drive signal, which is required to achieve the desired constant gain. As explained above, this desired constant gain is used in the determination of the error by the error generating circuit 24.

The speed of response of the output 40 in response to changes in the error signal at the input is a function of the settings of the PID controller. In particular, the proportional control implements amplification of the error signal, and thereby governs the speed of the gain control loop, as discussed above. The output of the PID controller is supplied to a mapping device 42 which prepares individual target pump source levels for the individual amplifier stages from the general target pump level, as explained with reference to FIG. 2. The individual target pump source levels for a particular general pump drive level are constant, whereas the temporal characteristics of the gain control loop vary as a function of the PID controller. These temporal characteristics are altered as a function of the general pump drive level at the output 40, and to achieve this a feedback path 44 is provided which alters the proportional control factor of the PID controller as a function of the general pump drive level, and as explained with reference to FIG. 3. For this purpose, a further mapping unit 46 is provided which controls the proportional controller in accordance with the graph of FIG. 3.

The invention enables critically damped (i.e. optimum) gain control to be achieved for a multi-stage amplifier, when the pump sources of the amplifier are independently controllable.

Although the invention has been described in connection with a two-stage optical amplifier, there may in practice be many more stages within the device. It will be apparent to those skilled in the art that the invention can implement any pump drive scheme, and is not limited to that illustrated with reference to FIG. 2. Indeed, using a look-up table, each general pump drive level may be associated with a completely independent combination of pump drive level- the individual pump levels do not need to have the simple fixed-gradient form as shown in FIG. 2. The P-control values may also adopt any suitable mapping.

Although only one specific control loop configuration has been shown in FIG. 4, the invention may be applied to any control scheme. The matching of the control loop characteristics to the pump signal levels, to achieve critical damping, enables the fastest response to input power changes, by minimising delays associated with over-damped control, whilst reducing the risk of instability in the control loop. A lower byte error rate results during control of the amplifier in response to transient changes in input power, and the interference of low frequency spectral components with the control loop is reduced.

The processing of the measured input and output powers in order to provide the pump control signals may be performed by a digital signal processor, which is configured to perform the processing steps explained with reference to FIG. 4. The steps may therefore be implemented as a set of computer executable instructions to be implemented by a signal processor or other microprocessor device.

We claim:

1. An optical amplifier comprising:

at least first and second amplifier stages, each stage comprising a doped fiber and a pump source for providing pump light to the fiber;

a power measurement circuit for measuring the input and output power of the amplifier;

a driver circuit for providing pump control signals for controlling the pump source of each amplifier stage in dependence on the input and output power in order to maintain a substantially constant gain, the power measurement circuit and the driver circuit defining a gain control loop, said driver circuit generating the pump source levels by processing an error signal using a PID controller with an output providing a general pump drive target level to influence the processing of the error signal thereby changing the temporal response of the gain control loop; and a mapping device for deriving the individual target pump source levels from the general pump drive level.

2. An amplifier according to claim 1, wherein the doped fiber of each stage comprises an Erbium doped optical fiber.

3. An amplifier according to claim 1, wherein the pump source of each amplifier stage comprises a laser diode, and wherein the driver circuit provides laser diode drive currents.

4. An amplifier according to claim 1, wherein a first general pump drive level input to the mapping device gives rise to target pump source levels with the pump source of one amplifier stage turned on and the pump source of the other amplifier stage turned off, and a second general pump drive level input to the mapping device gives rise to target pump source levels with the pump source of both amplifier stages turned on.

5. An amplifier according to claim 1, wherein the general pump drive level is provided to a proportional gain controller which controls the level of the proportional gain setting of the PID controller.

* * * * *